(12) United States Patent
Kim et al.

(10) Patent No.: US 11,743,863 B2
(45) Date of Patent: *Aug. 29, 2023

(54) METHOD FOR PAGING INFORMATION IN CELLULAR SYSTEM

(71) Applicant: Electronics and Telecommunications Research Institute, Daejeon (KR)

(72) Inventors: Jae Heung Kim, Daejeon (KR); Jung Im Kim, Daejeon (KR); Kyoung Seok Lee, Daejeon (KR); Soo Jung Jung, Daejeon (KR); Seung Chan Bang, Daejeon (KR); Byung Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,177

(22) Filed: Jun. 11, 2022

(65) Prior Publication Data

US 2022/0322287 A1 Oct. 6, 2022

Related U.S. Application Data

(63) Continuation of application No. 17/110,346, filed on Dec. 3, 2020, now Pat. No. 11,395,258, which is a
(Continued)

(30) Foreign Application Priority Data

Apr. 26, 2006 (KR) .................. 10-2006-0037522
Apr. 20, 2007 (KR) .................. 10-2007-0038849

(51) Int. Cl.
*H04W 68/02* (2009.01)
*H04W 72/23* (2023.01)
*H04L 5/00* (2006.01)

(52) U.S. Cl.
CPC ......... *H04W 68/025* (2013.01); *H04L 5/0053* (2013.01); *H04W 68/02* (2013.01); *H04W 72/23* (2023.01)

(58) Field of Classification Search
CPC ............. H04W 68/02; H04W 72/0453; H04W 84/027; H04W 68/025; H04W 72/042; H04L 5/0053
See application file for complete search history.

(56) References Cited

U.S. PATENT DOCUMENTS 6,438,375 B1 * 8/2002 Muller .............. H04W 52/0216
455/435.3
6,512,748 B1 1/2003 Mizuki et al.
(Continued)

FOREIGN PATENT DOCUMENTS

EP   1 530 395 B1   5/2005
EP   1 981 305 B1   6/2013
(Continued)

OTHER PUBLICATIONS

3GPP RAN1/RAN2 joint meeting on LTE, R2-060988, Athens, Greece, Mar. 27-31, 2006, (Year: 2006).*
(Continued)

*Primary Examiner* — Dung Hong
(74) *Attorney, Agent, or Firm* — Insight Law Group, PLLC; Seung Lee

(57) ABSTRACT

Provided is a method for transmitting paging information in a cellular system. An object of the method is transmitting paging information which can improve applicability of a limited radio resource by variably and flexibly setting up and mapping a transport channel and a physical channel in order to transmit information notifying start of downlink information from a base station to a terminal in a cellular system for packet transmission. The method includes the steps of: forming a paging channel (PCH) in a transport channel
(Continued)

corresponding to generation of paging information; setting a paging indication channel (PICH) based on the paging information and forming the paging indication channel in a radio resource of a physical layer; and allocating the paging channel to the radio resource of the physical layer.

21 Claims, 7 Drawing Sheets

Related U.S. Application Data continuation of application No. 16/258,821, filed on Jan. 28, 2019, now Pat. No. 11,076,383, which is a continuation of application No. 14/844,359, filed on Sep. 3, 2015, now Pat. No. 10,231,211, which is a continuation of application No. 14/276,511, filed on May 13, 2014, now Pat. No. 9,155,066, which is a continuation of application No. 12/298,227, filed as application No. PCT/KR2007/001997 on Apr. 24, 2007, now Pat. No. 8,761,814.

(56) References Cited

U.S. PATENT DOCUMENTS

| | | | |
|---|---|---|---|
| 7,826,859 B2 | 11/2010 | Lee | |
| 8,135,420 B2 | 3/2012 | Lee | |
| 8,682,357 B2 | 3/2014 | Worrall | |
| 8,761,814 B2* | 6/2014 | Kim | H04W 68/025 455/515 |
| 9,155,066 B2* | 10/2015 | Kim | H04W 68/025 |
| 10,231,211 B2* | 3/2019 | Kim | H04W 72/042 |
| 11,076,383 B2* | 7/2021 | Kim | H04L 5/0053 |
| 11,395,258 B2* | 7/2022 | Kim | H04W 72/042 |
| 2003/0039230 A1* | 2/2003 | Ostman | H04W 72/04 370/335 |
| 2003/0088695 A1 | 5/2003 | Kwak et al. | |
| 2004/0114552 A1 | 6/2004 | Lim et al. | |
| 2004/0180675 A1* | 9/2004 | Choi | H04L 65/4076 455/458 |
| 2004/0228294 A1* | 11/2004 | Kim | H04W 72/02 370/312 |
| 2005/0192021 A1* | 9/2005 | Lee | H04W 76/15 455/452.2 |
| 2005/0277429 A1* | 12/2005 | Laroia | H04W 68/025 455/434 |
| 2005/0288040 A1 | 12/2005 | Charpentier et al. | |
| 2006/0029011 A1* | 2/2006 | Etemad | H04W 68/02 370/477 |
| 2007/0058595 A1 | 3/2007 | Classon et al. | |
| 2007/0064669 A1 | 3/2007 | Classon et al. | |
| 2007/0133458 A1 | 6/2007 | Chandra et al. | |
| 2007/0173269 A1* | 7/2007 | Laroia | H04W 72/005 455/500 |
| 2010/0062795 A1* | 3/2010 | Lee | H04W 68/025 455/458 |

FOREIGN PATENT DOCUMENTS

| | | |
|---|---|---|
| JP | 2001-078267 A | 3/2001 |
| JP | 2006-033820 A | 2/2006 |
| KR | 2003-0084215 A | 11/2003 |
| KR | 10-2005-0044981 A | 5/2005 |
| WO | 99/49626 A1 | 9/1999 |
| WO | 2005/046087 A1 | 5/2005 |
| WO | 2005/071985 A1 | 8/2005 |

OTHER PUBLICATIONS

6:21-cv-00270—*Sol IP, LLC* v. *Qualcomm, Inc. et al.*, filed Mar. 17, 2021, in Western District of Texas; and.

2:22-cv-00097—*Sol IP, LLC* v. *Ford Motor Company*, filed Apr. 22, 2022, in Eastern District of Texas.
2:18-cv-00526—*Sol IP, LLC et al.* v. *AT&T, Inc. et al.*, filed Dec. 3, 2018, in Texas Eastern District Court.
2:18-cv-00527—*Sol IP, LLC et al.* v. *Sprint Corporation et al.*, filed Dec. 3, 2018, in Texas Eastern District Court; and.
2:18-cv-00528—2:18-cv-00528—*Sol IP, LLC et al.* v. *Cellco Partnership, Inc. et al.* filed Dec. 3, 2018, in Texas Eastern District Court.
IPR2020-00253 for U.S. Pat. No. 8,761,814 (issued from U.S. Appl. No. 12/298,227); and.
IPR2020-00252 for U.S. Pat. No. 9,155,066 (issued from U.S. Appl. No. 14/276,511).
U.S. Appl. No. 17/110,346, Jae Heung Kim et al., filed Dec. 3, 2020, Pending.
U.S. Appl. No. 16/258,821, Jae Heung Kim et al., filed Jan. 28, 2019, U.S. Pat. No. 11,076,383.
U.S. Appl. No. 14/844,359, Jae Heung Kim et al., filed Sep. 3, 2015, U.S. Pat. No. 10,231,211.
U.S. Appl. No. 14/276,511, Jae Heung Kim et al., filed May 13, 2014, U.S. Pat. No. 9,155,066.
U.S. Appl. No. 12/298,227, Jae Heung Kim et al., filed Oct. 23, 2008, U.S. Pat. No. 8,761,814.
R2-99a51 (TSGR2#7(99)A51), Report from e-mail discussion on RRC procedures, Sep. 20-24, 1999, TSG-RAN Working Group 2 (Radio layer 2 and Radio layer 3), by Rapporteur (Ericsson) ("R2-99a51").
R2-99d50 (TSGR2#8(99)d50), 3GPP TS 25.331: RRC Protocol Specification, Nov. 2-5, 1999, TSG-RAN Working Group 2 (Radio L2 and Radio L3) ("R2-99d50").
R1-00-0841,3G TR 25.928 V1.0.0, 1.28Mcps functionality for UTRA TDD Physical Layer, Jul. 4-7, 2000, 3GPP TSG RAN WG1 #14, by 3GPP ("R1-00-0841").
R2-051711, Shared Channels, IP Based QoS Etc., IP Wireless, 3GPP TSG RAN WG2 LTE Ad-Hoc, Jun. 20-21, 2005,Sophia Antipolis, France ("R2-051711").
R2-051738, PowerPoint Presentation, Evolution of the Radio Interface Protocol Architecture, 3GPP TSG RAN WG2 Adhoc, Sophia Antipolis, France, Jun. 20-21, 2005 ("R2-051738").
R2-051734, Long-Term Evolution of Radio Link Layer, 3GPP TSG RAN WG2 LTE ad-hoc Jun. 20-21, 2005, Sophia Antipolis, France ("R2-051734").
R1-051090, DL resource allocation considerations, Oct. 10-14, 2005, 3GPP TSG RAN WG1 Meeting #42bis, by Nokia ("R1-051090").
3GPP TS 25.331 V6.7.0, Sep. 2005, by 3GPP ("3GPP TS25.331 V6.7.0").
R1-060092, Paging for E-UTRA, Jan. 23-25, 2006, TSGRAN WG1 LTE AdHoc, by Ericsson ("R1-060092").
R1-060186, OFDMA Downlink L1/L2 control signaling—text proposal, Jan. 23-25, 2006, 3GPP TSG RAN WG1 LTE Ad Hoc Meeting, by Nokia ("R1-060186").
R1-060187, OFDMA Downlink Physical channel mapping—text proposal, Jan. 23-25, 2006, TSG RAN WG1 LTE Ad Hoc Meeting, by Nokia ("R1-060187").
R2-060429, Evolved Paging for LTE, Philips, 3GPP TSG—RAN WG2 Meeting #51, Denver, USA, Feb. 13-17, 2006 ("R2-060429").
R1-060286, Resource block allocation—mapping rules, Feb. 13-17, 2006, RAN1 meeting #44, by Nokia ("R1 -060286").
R1-060572, LTE physical-layer models, Feb. 13-17, 2006, TSG-RAN WG1 #44, by Ericsson ("R1-060572").
R1-060576, Paging for E-UTRA, Feb. 13-17, 2006, TSG RAN WG1 #44, by Ericsson ("R1-060576").
R1-060577, Text Proposal on E-UTRA Paging, Feb. 13-17, 2006, TSG RAN WG1 #44, by Ericsson ("R1-060577").
3GPP Technical Report 25.813 v0.6.0 ("TR 25.813 v0.6.0").
R2-060913, User ID assignment during initial access, Mar. 27-31, 2006, Joint RAN1/RAN2 meeting on LTE, by IPWireless ("R2-060913").
R2-060837 (Original R1-060034), Paging Channel Structure for E-UTRA Downlink, Mar. 27-31, 2006, Joint RAN1/RAN2 meeting on LTE, by NTT DoCoMo, Fujitsu, Mitsubishi Electric, NEC, Toshiba Corporation ("R2-060837").

(56) References Cited

OTHER PUBLICATIONS

R2-060942, Paging/Broadcast Control, Mar. 27-31, 2006, TSG RAN WG2 #53, by Motorola ("R2-060942").
R2-060967, DRX and DTX in LTE_Active, Mar. 27-31, 2006, TSG-RAN WG2 Meeting #52, by Ericsson("R2-060967").
R2-061014, Discussion on LTE Paging and DRX, Mar. 27-31, 2006, Joint RAN1/RAN2 meeting on LTE, by LG Electronics ("R2-061014").
R2-060849, Evolved Paging for LTE, 3GPP TSG Joint Meeting RAN WG1 and RAN WG2 on LTE, Athens, Greece, Mar. 27-31, 2006 ("R2-060849").
R2-060865, PCH transport channel, Joint RAN1/RAN2 meeting on LTE, Athens, Greece, Mar. 27-31, 2006 ("R2-060865").
R2-060913, User ID assignment during initial access, Mar. 27-31, 2006, Joint RAN WG1 and WG2 on LTE, by IPWireless ("R2-060913").
R2-060988, PCH Mapping and Paging Control, Mar. 27-31, 2006, Joint RAN1/RAN2 meeting on LTE, by CATT("R2-060988").
3GPP Technical Report 25.814 v1.2.2 ("TR 25.814 v1.2.2").
3GPP Technical Report 25.814 v1.2.3 ("TR 25.814").
R2-063275, Transmission mechanism of paging Indicators, CATT, 3GPP TSG-RAN WG2#56 Riga, Latvia, Nov. 6-10, 2006 ("R2-063275").
R1-070753, Text proposal for Stage 2 TS, 3GPP TSG RAN WG1 Meeting #48 by LTE rapporteur (NTT DoCoMo) ("R1-070753").
R2-060007, E-UTRA Transport Channels, 3GPP TSG RAN WG2#50, Sophia Antipolis, France, Jan. 9-13, 2006, by Panasonic ("R2-060007") (submitted in place of R1-060007 cited in Appendix B).
R1-060093, Text Proposal on E-UTRA Paging, Jan. 23-25, 2006, TSG-RAN WG1 LTE AdHoc, by Ericsson("R1-060093").
R2-060015, Evolved Paging for LTE, 3GPP TSG-RAN WG2 Meeting #50, Sophia-Antipolis, France, Jan. 9-13, 2006 ("R2-060015").
R2-060945, Control Signaling, Mar. 27-31, 2006, 3GPP TSG RAN WG2 #52, by Motorola ("R2-060945").
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits B-1-B-10 for Defendant's Preliminary Invalidity Contentions submitted on Jul. 22, 2019 for Case No. 2:18-cv-00526 (E.D. Texas).
Appendix B for Defendant's Preliminary Invalidity Contentions submitted on Jul. 22, 2019 for Case No. 2:18-cv-00526 (E.D. Texas).
Exhibits C-1-C-10 for Defendant's Preliminary Invalidity Contentions submitted on Jul. 22, 2019 for Case No. 2:18-cv-00526 (E.D. Texas).
Appendix C for Defendant's Preliminary Invalidity Contentions submitted on Jul. 22, 2019 for Case No. 2:18-cv-00526 (E.D. Texas).
Exhibits AA-1-AA-10 for Defendant's Preliminary Invalidity Contentions submitted on Jul. 22, 2019 for Case No. 2:18-cv-00526 (E.D. Texas).
Appendix AA for Defendant's Preliminary Invalidity Contentions submitted on Jul. 22, 2019 for Case No. 2:18-cv-00526 (E.D. Texas).
"PCH mapping and paging control", 3GPP RAN 1/RAN2 meeting on LTE, Mar. 27-31, 2006 (Year: 2006).
3GPP TS 25.211 V7.0.0 (Mar. 2006).
Supplemental European Search Report for Application No. EP 07746159, dated Oct. 17, 2012.
3GPP TS25.211; 3rd Generation Partnership Project; Technical Specification Group Radio Access Network; Physical channels and mapping of transport channels onto physical channels (FOD) (Release 7); 03, 2006. pp. 1-50.
"PCH Mapping and Paging Control" by CATT, 3GPP RAN1/RAN2 joint meeting on L TE, Athens, Greece, Mar. 27-31, 2006, pp. 2-6, R2-060988.
International Search Report, Application No. PCT/KR2007/001997, dated Aug. 8, 2007.

Non-final office action dated May 24, 2011 for U.S. Appl. No. 12/298,227.
Final office action dated Mar. 6, 2012 for U.S. Appl. No. 12/298,227.
Non-final office action dated Mar. 18, 2013 for U.S. Appl. No. 12/298,227.
Final office action dated Sep. 12, 2013 for U.S. Appl. No. 12/298,227.
Notice of Allowance dated Feb. 13, 2014 for U.S. Appl. No. 12/298,227.
Notice of Trial Termination dated Mar. 9, 2020 for U.S. Pat. No. 8,761,814 (U.S. Appl. No. 12/298,227).
Non-final office action dated Aug. 1, 2014 for U.S. Appl. No. 14/276,511.
Final office action dated Mar. 3, 2015 for U.S. Appl. No. 14/276,511.
Notice of Allowance dated Jun. 5, 2015 for U.S. Appl. No. 14/276,511.
Notice of Trial Termination dated Mar. 9, 2020 for U.S. Pat. No. 9,155,066 (U.S. Appl. No. 14/276,511).
Non-final office action dated Oct. 22, 2015 for U.S. Appl. No. 14/844,359.
Notice of Allowance dated May 20, 2016 for U.S. Appl. No. 14/844,359.
Non-final office action dated Oct. 6, 2016 for U.S. Appl. No. 14/844,359.
Final office action dated Jun. 15, 2017 for U.S. Appl. No. 14/844,359.
Non-final office action dated Oct. 6, 2017 for U.S. Appl. No. 14/844,359.
Non-final office action dated Dec. 28, 2017 for U.S. Appl. No. 14/844,359.
Notice of Allowance dated Jul. 5, 2018 for U.S. Appl. No. 14/844,359.
Notice of Allowance dated Nov. 2, 2018 for U.S. Appl. No. 14/844,359.
Non-final office action dated Feb. 20, 2019 for U.S. Appl. No. 16/258,821.
Final office action dated Aug. 22, 2019 for U.S. Appl. No. 16/258,821.
Non-final office action dated Mar. 5, 2020 for U.S. Appl. No. 16/258,821.
Notice of Allowance dated Oct. 1, 2020 for U.S. Appl. No. 16/258,821.
*Sol IP, LLC v. AT&T, et al.* Mobility Preliminary Constructions on Dec. 4, 2019 ("Court's Preliminary Constructions").
"PCH mapping and Paging control" submitted to 3GPP at the Mar. 27-31, 2006 joint meeting of the 3GPP RAN1/RAN2 in Athens, Greece by China Academy of Telecommunications Technology ("CATT") ("R2-060988").
"LTE physical-layer models" submitted to 3GPP at the TSG-RAN WG1 #44 in Denver, Colorado on Feb. 13-17, 2006 by Ericsson ("R1-060572").
"Physical Layer Aspects for Evolved UTRA (Release 7)," Technical Report of 3GPP published in Apr. 2006 ("3 GPP TR 25.814 v1.2.2 (Mar. 2006)").
"Evolved Paging for LTE" submitted to 3GPP at the 3GPP TSG-RAN WG2 Meeting #51 in Denver, Colorado on Feb. 13-17, 2006 by Philips ("R2-060429").
"Paging for E-UTRA" submitted to 3GPP at the TSG-RAN WG1 #44 in Denver, Colorado on Feb. 13-17, 2006 by Ericsson ("R1-060576").
"OFDMA Downlink Physical channel mapping—text proposal" submitted to 3GPP at the 3GPP TSG RAN WG1 LTE Ad Hoc Meeting in Helsinki, Finland on Jan. 23-25, 2006 by Nokia ("R1-060187").
"3rd Generation Partnership Project; Technical Specification Group Radio Access Network; Physical channels and mapping of transport channels onto physical channels (FDD) (Release 6)" ("3GPP TS 25.211 v6.7.0 (Dec. 2005)").
3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7) ("3GPP TR 25.813 v0.8.0 (Apr. 2006)").
First Amended Complaint for Patent Infringement, *Sol IP, LLC v. AT&T Mobility LLC*, Case No. 2:18-cv-00526 (E.D. Tex.), filed on Mar. 22, 2019 ("Complaint").
Corrected Petition for Inter Partes Review IPR 2020-00252 submitted on Dec. 11, 2019.

(56) References Cited

OTHER PUBLICATIONS

Declaration of Dr. Wayne Stark submitted on Dec. 10, 2019 for IPR 2020-00252.
Declaration of Craig Bishop submitted on Dec. 10, 2019 for IPR 2020-00252.
Petition for Inter Partes Review IPR 2020-00253 submitted on Dec. 10, 2019.
Corrected Declaration of Dr. Wayne Stark submitted on Dec. 11, 2019 for IPR 2020-00253.
Declaration of Craig Bishop submitted on Dec. 10, 2019 for IPR 2020-00253.
Notice of Termination for IPR2020-00252 and 00253 entered Mar. 9, 2020.
Complaint filed Mar. 17, 2021 in the Western District of Texas (Waco Division) for Case No. 6:21-cv-00270.
Amended Complaint filed Apr. 22, 2022 in the Eastern District of Texas for Case No. 2:22-cv-00097.
Non-final office action dated Jul. 15, 2021 for U.S. Appl. No. 17/110,346.
Notice of Allowance dated Feb. 15, 2022 for U.S. Appl. No. 17/110,346.
Notice of Allowance dated Mar. 21, 2022 for U.S. Appl. No. 17/110,346.

* cited by examiner

FIG. 6
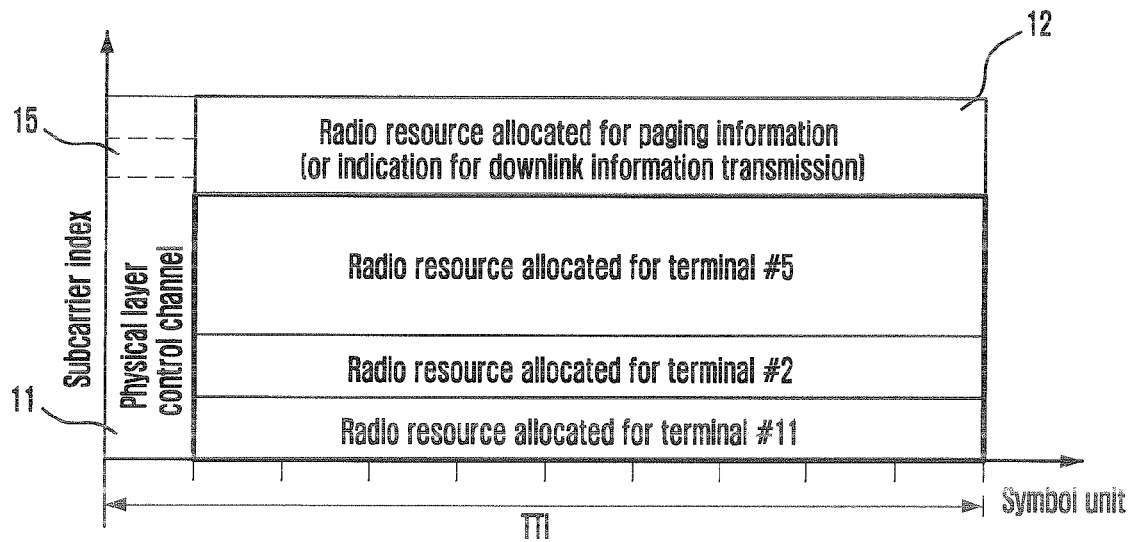
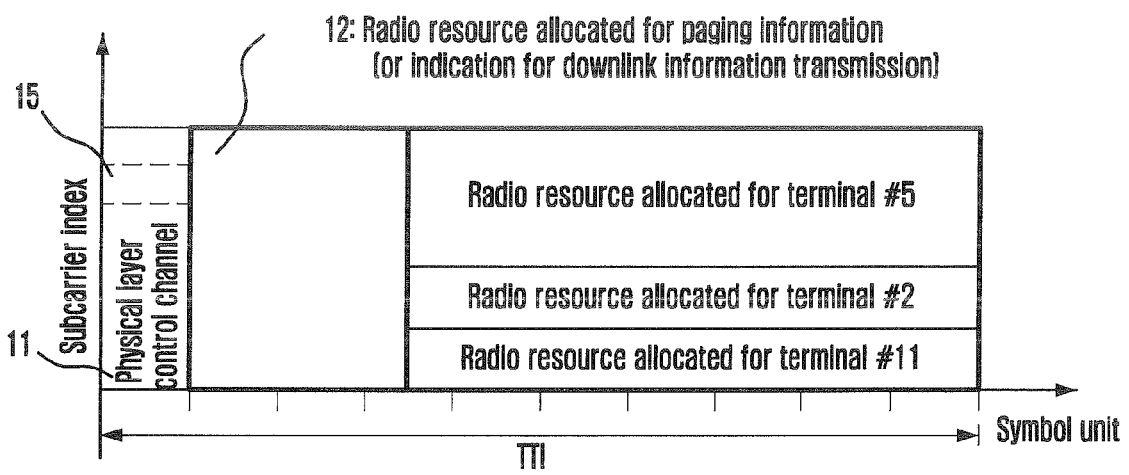

METHOD FOR PAGING INFORMATION IN CELLULAR SYSTEM

CROSS REFERENCE TO RELATED APPLICATIONS

This application is a continuation application of U.S. application Ser. No. 17/110,346, filed Dec. 3, 2020 (now pending), which is a continuation application of U.S. application Ser. No. 16/258,821, filed Jan. 28, 2019 (now U.S. Pat. No. 11,076,383), which is a continuation application of U.S. patent application Ser. No. 14/844,359, filed Sep. 3, 2015 (now U.S. Pat. No. 10,231,211), which is a continuation application of U.S. patent application Ser. No. 14/276,511, filed May 13, 2014 (now U.S. Pat. No. 9,155,066), which is a continuation application of U.S. patent application Ser. No. 12/298,227, filed Oct. 23, 2008 (now U.S. Pat. No. 8,761,814), the disclosures of which are herein incorporated by reference in their entirety. The U.S. patent application Ser. No. 12/298,227 is a national entry of International Application No. PCT/KR2007/001997, filed on Apr. 24, 2007, which claims priority to Korean Application Nos. 10-2006-0037522 and 10-2007-0038849 filed on Apr. 26, 2006 and Apr. 20, 2007, respectively, the entire contents of which are incorporated herein by reference.

TECHNICAL FIELD

The present invention relates to a method for transmitting paging information in a cellular system; and, more particularly, to a method for transmitting paging information notifying generation of downlink information from a base station to a terminal in a cellular system for providing a packet service.

BACKGROUND ART

A conventional cellular system is operated by fixedly allocating a transport channel and a physical channel for paging information. In particular, in a $3^{rd}$ Generation Partnership Project (3GPP) system of a Wideband Code Division Multiple Access (WCDMA) method, a paging channel (PCH) is a transport channel and is transmitted through a secondary common control physical channel (S-CCPCH), which is a physical layer channel for transmitting common control information. A forward access channel (FACH), which is a transport channel having a similar attribute to the paging channel, and a paging channel can be mapped to the S-CCPCH.

In a conventional WCDMA system, a radio resource is assigned by allocating a code index of orthogonal variable spreading factor (OVSF) with orthogonality. Therefore, an individual OVSF code index is allocated to the S-CCPCH and another physical layer channel may not use or share the OVSF code index allocated to the S-CCPCH. Although there is no information to be transmitted from a base station to a terminal through the transport channel PCH and FACH at a given time, the physical layer channel S-CCPCH exists. Although there is no transmitted information in the S-CCPCH, the OVSF code index and another radio resource, i.e., power, are allocated and thus radio resources are wasted.

A general paging procedure is as follows. Terminals are included in a specific paging group defined for an efficient paging procedure in a system. Therefore, the base station notifies that a paging message arrives at terminals included in a corresponding group through the paging indication channel (PICH), which is a physical layer channel. The terminals monitor the paging indication channel every monitoring cycle. As a result of monitoring, when it is sensed that indication information corresponding to the group including the terminal exists in the paging indication channel, the terminals search PCH information transmitted to the S-CCPCH channel and decode paging information that an identifier (ID) such as international mobile subscriber identity (IMSI), temporary mobile subscriber identity (TMSI), UMTS terrestrial radio access network-radio network temporary identifier (U-RNTI) exists. The terminals decoding the paging information performs following procedures corresponding to the paging information.

Also, a plurality of S-CCPCHs may be operated to obtain a paging capability according to an environment of the base station and the capacity for subscribers of the base station. When the base station is installed based on a cell specific parameter, the S-CCPCH is statically operated. The radio resource allocating method, which is statically operated in consideration of the maximum capacity, has a merit that a circuit based-system is statically operated, but has a problem that the limited radio resource is wasted.

A long term evolution (LTE) system standardized in 3GPP to provide diverse packet services is a packet based-system. An object of the LTE system is to provide a pure packet service. Therefore, in the LTE system for providing a packet service having a burst characteristic, efficient and variable methods for utilizing radio resources are needed. Accordingly, a research for simplifying and integrating diverse kinds of transport channels operated in the conventional WCDMA method are being progressed.

DISCLOSURE

Technical Problem

An embodiment of the present invention is directed to providing a method for transmitting paging information which can improve applicability of a limited radio resource by variably and flexibly setting up and mapping a transport channel and a physical channel in order to transmit information notifying start of downlink information from a base station to a terminal in a cellular system for packet transmission.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for transmitting paging information in a cellular system, including the steps of: forming a paging channel (PCH) in a transport channel corresponding to generation of paging information; setting a paging indication channel (PICH) based on the paging information and forming the paging indication channel in a radio resource of a physical layer; and allocating the paging channel to the radio resource of the physical layer.

In accordance with another aspect of the present invention, there is provided a method for transmitting paging information in a cellular system, including the steps of: creating a paging channel including a paging message (P-MSG) correspondingly to generation of paging information; allocating the paging message to a radio resource of a physical channel; creating scheduling information corresponding to the paging message; and allocating the scheduling information to a physical layer control channel.

Advantageous Effects

The present invention can improve applicability of a limited radio resource by variably and flexibly setting up and mapping a transport channel and physical channel in a method for transmitting information notifying start of downlink information from a base station to a terminal in a cellular system for packet transmission.

Also, the present invention can maximally apply a limited radio resource by variably operating a procedure of notifying generation of downlink information to initiate or restart downlink information transmission from the base station to the terminal in a packet based-cellular system.

BRIEF DESCRIPTION OF THE DRAWINGS

FIG. 6 shows a physical layer control channel to which scheduling ID information is allocated and a radio resource to which paging information is variably allocated in accordance with the second embodiment of the present invention.

BEST MODE FOR THE INVENTION

Figure 1:
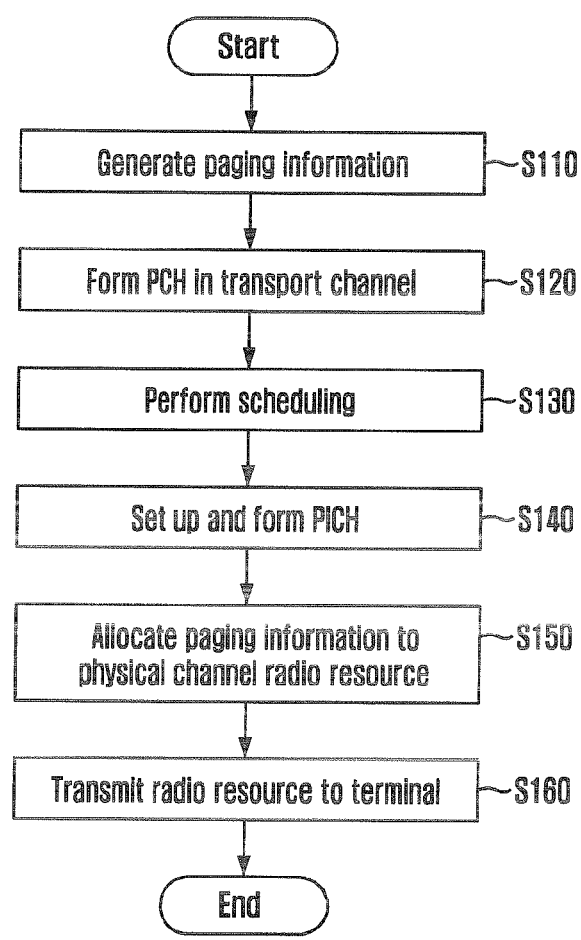
FIG. 1 is a flowchart describing a paging information transmitting procedure in accordance with a first embodiment of the present invention.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. A technology outline of a cellular system for providing a packet service to which the present invention is applied is will be described in brief, and the preferred embodiments of the present invention will be described in detail hereinafter with reference to the attached drawings. The cellular system for the packet service may maximize applicability of a limited radio resource by sharing the radio resource between a base station and a terminal in consideration of a bust characteristic of packet service data differently from a circuit. A $3^{rd}$ Generation Partnership Project (3GPP) long term evolution (LTE) system, which is being standardized as the cellular system for the packet service should support bandwidth scalability of a bandwidth ranging 1.25 MHz to 20 MHz. In designing of a general system, scalability for 5 MHz, 10 MHz, and 20 MHz bandwidths is assumed.

Conventional paging information is transmitted to the terminals in an idle state, i.e., the terminals performing low power consumption, through a paging channel, and the terminals providing a service through a dedicated channel. In the LTE system, the terminals are defined as following states in consideration of Radio Resource Control (RRC) and Medium Access Control (MAC).

In consideration of RRC, the terminal state is managed as RRC_Connected and RRC_Idle states. The RRC_Connected denotes a state that the RRC is connected between the base station and the terminal. In the RRC_Connected state, the base station manages mobility of the terminal, and stores and manages a RRC context. The RRC_Idle denotes a state that the RRC is not connected between the base station and the terminal. In the RRC_Idle state, access GateWay (aGW) manages mobility of the terminal. The terminal in the RRC_Idle state performs a low power consumption, i.e., power saving operation, according to a discontinuous reception (DRX) cycle based on RRC configuration.

In the RRC_Connected state, an MAC mode is divided into a MAC_Active mode and an MAC_Dormant mode and is controlled for a low power consumption of the terminal according to activity factors occupying the radio resource between the terminal and the base station. The MAC_Active mode means that uplink synchronization of the physical layer is maintained and packet information is transmitted/received between the base station and the terminal. The MAC_Dormant mode means that a buffer is empty without transmitting/receiving packet information between the base station and the terminal in the MAC_Active. When a packet is not transmitted/received for a predefined time in the MAC_Active mode, the terminal transfers to the MAC_Dormant mode. In the MAC_Dormant mode, a low power consumption operation is performed according to discontinuous reception (DRX)/discontinuous transmission (DTX) cycle by a scheduler. Also, it may not to maintain the uplink synchronization of the physical layer by control of the base station.

When it is considered that paging notifying generation of information to be transmitted on the downlink should be performed on the terminals performing the low power consumption according to the DRX/DTX cycle, paging of the LTE system is applied to the terminals in the RRC_Idle state and the MAC_Dormant mode. In the present invention, paging is performed on the terminals in the RRC_Idle state, and a method using a paging indication channel, which is a physical layer channel, and a method to be applied without the paging indication channel, are provided.

In the packet transmission system, since the terminals in the base station share radio resources, scheduling information for addressing the radio resource allocated to a terminal or a terminal group should be transmitted such that the terminals in the base station can recognize the scheduling information. Accordingly, the present invention provides a method for transmitting scheduling information through a physical layer control channel.

Figure 2:
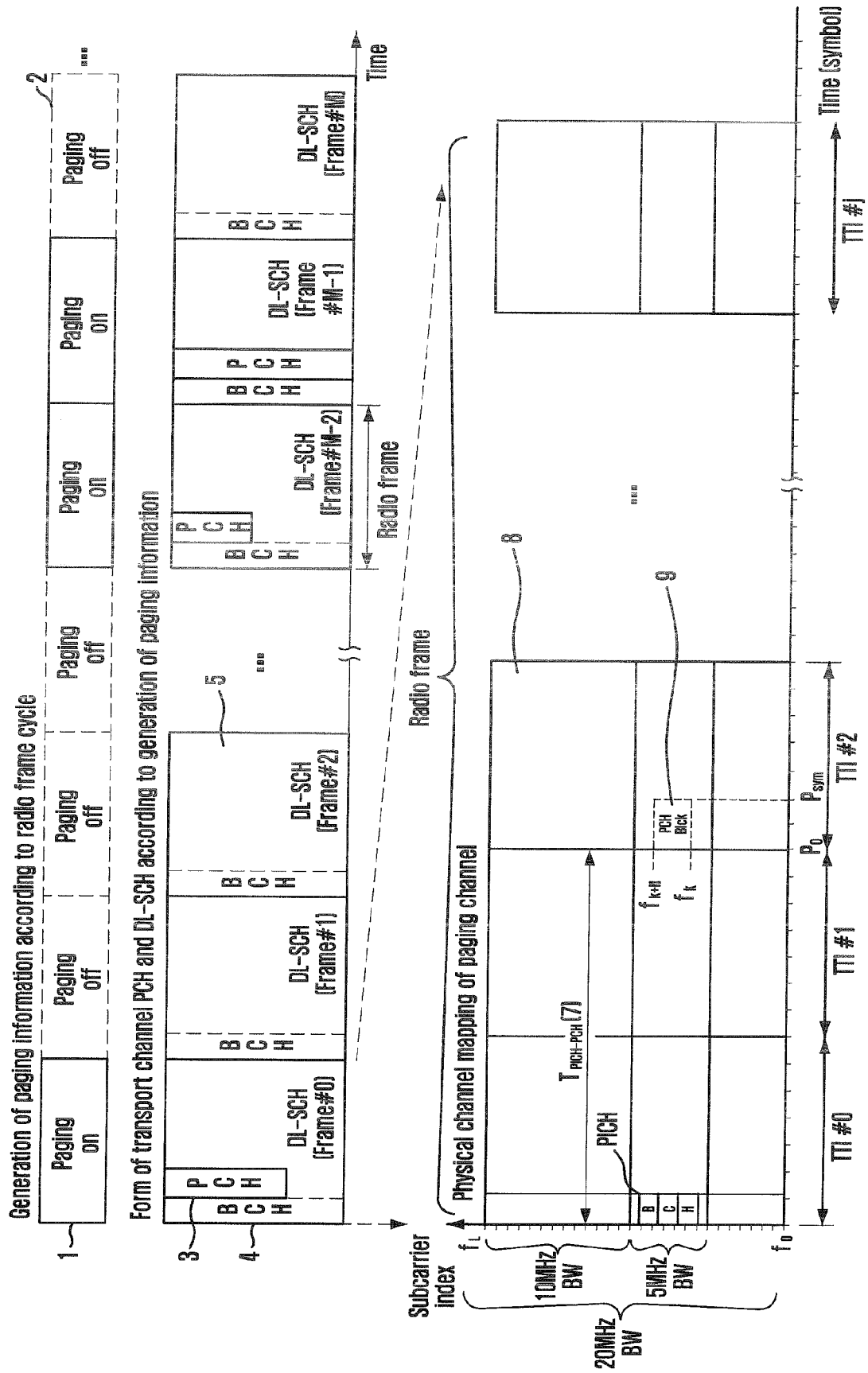
FIG. 2 shows a transport channel and a physical channel in accordance with the first embodiment of the present invention.

FIG. 1 is a flowchart describing a paging information transmitting procedure in accordance with a first embodiment of the present invention and FIG. 2 shows a transport channel and a physical channel in accordance with the first embodiment of the present invention.

In the present embodiment, paging information is transmitted to the terminals in the RRC_Idle state through the paging indication channel, which is a physical channel. A paging information transmitting procedure will be described in detail according to the embodiment with reference to FIGS. 1 and 2.

When paging information 1 on a terminal or a group of terminals at a predetermined time is generated at step S110, the base station has a paging channel (PCH) included in the transport channel based on the generated paging information at step S120.

The scheduler performs scheduling on broadcasting channel (BCH) information, created paging channel information and, traffic information to be transmitted to the terminal based on a transmission time interval (TTI) at step S130.

In consideration of a DRX cycle for a low power consumption of the terminals in the RRC_Idle state, the base station sets up a paging indication channel 6 corresponding to the terminal or the terminal group indicated by the paging information and forms the paging indication channel 6 at step S140 such that the terminal in the system can be divided into groups.

The base station performs mapping on the paging channel with a radio resource block location 9 of a physical layer allocated at TTI 8 as a fixed size and location, e.g., a time index and a sub-carrier index, based on a $T_{paging\ indication\ channel-PCH}$ value 7 at step S150, modulates and codes a radio resource based on the pre-set up modulating and coding methods, and transmits the radio resource to the terminal at step S160. The $T_{paging\ indication\ channel-PCH}$ value is a parameter notifying a time difference between the paging indication channel and the TTI that the paging channel is transmitted. The $T_{paging\ indication\ channel-PCH}$ value is set up as a multiple TTI.

In the present embodiment, a method for dividing a location of the physical layer radio resource block for paging channel transmission into paging indication channel groups, and fixing and allocating the location of the physical layer radio resource block according to each group is adopted. When no paging information is generated (see 2 of FIG. 2), the paging channel does not exist in the transport channel of the radio frame (see 5 of FIG. 2). In this case, the paging indication channel is not also set up. Therefore, downlink shared channel (DL-SCH) information for user data transmission and not paging information of the paging channel is transmitted to the radio resource block location of the physical layer fixed and allocated for the paging channel.

Figure 3:
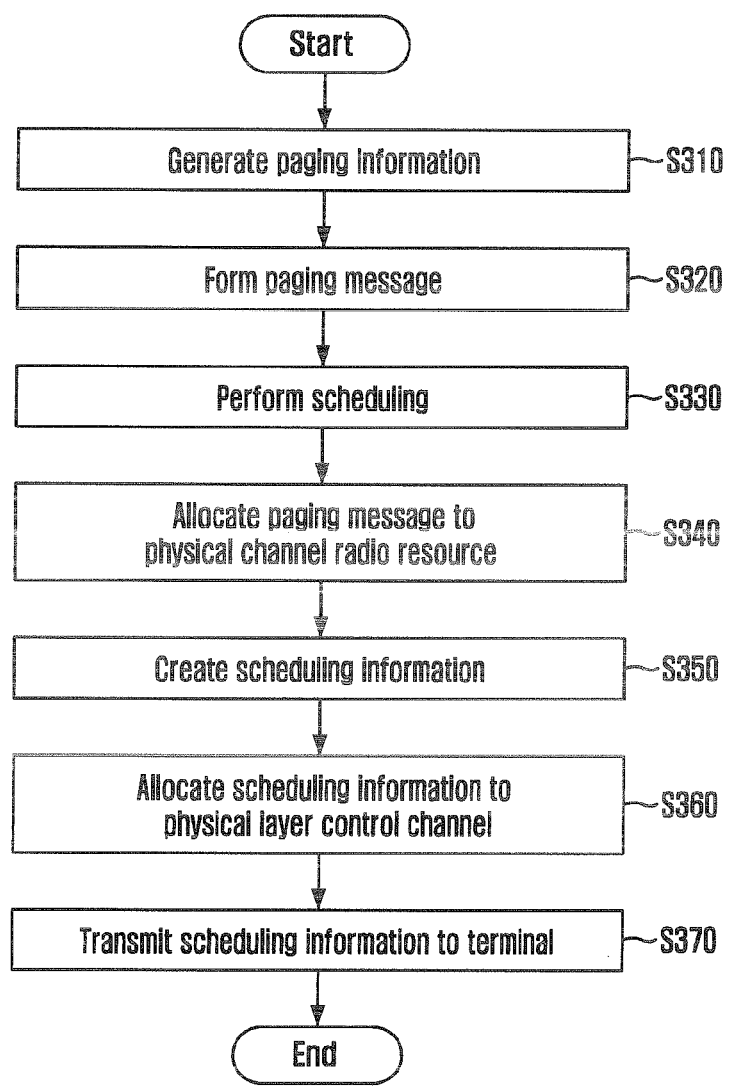
FIG. 3 is a flowchart describing a paging information transmitting procedure in accordance with a second embodiment of the present invention.
Figure 4:
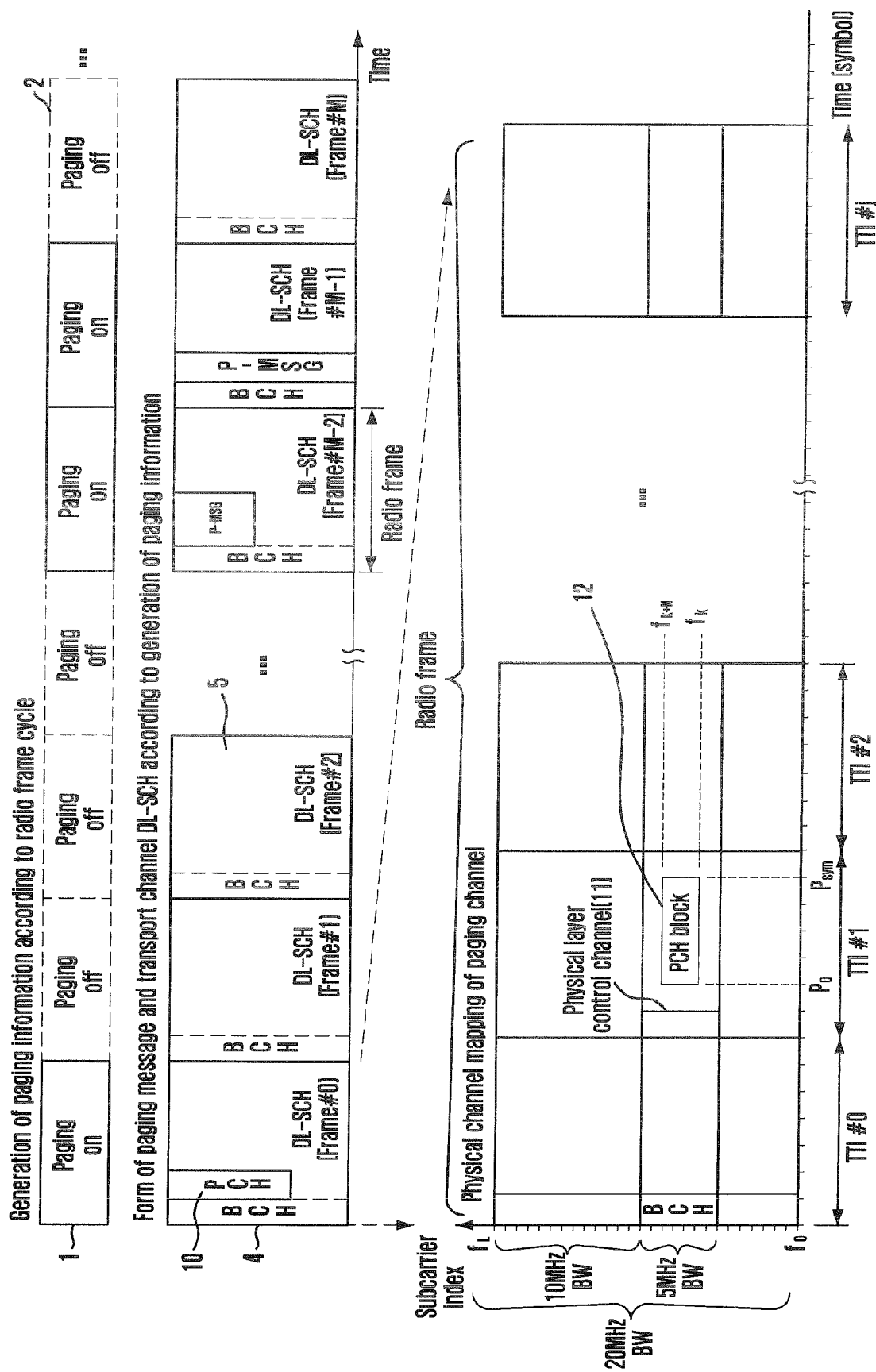
FIG. 4 shows the transport channel and the physical channel in accordance with the second embodiment of the present invention.

FIG. 3 is a flowchart describing a paging information transmitting procedure in accordance with a second embodiment of the present invention and FIG. 4 shows the transport channel and the physical channel in accordance with the second embodiment of the present invention. A paging information transmitting procedure will be described in detail with reference to FIGS. 3 and 4.

When paging information 1 for a terminal or a terminal group is generated at a given time at step S310, the base station creates a paging channel 10 including a paging message (P-MSG) based on the generated paging information at step S320.

A scheduler performs scheduling on broadcasting channel (BCH) information formed based on a radio frame unit, paging message information and traffic information to be transmitted to the terminals on the basis of TTI at step S330.

The paging message is variably allocated to a radio resource 12 of the physical channel at step S340.

Scheduling information is created at step S350, allocated to the physical layer control channel at step S360, and modulated and coded according to the pre-determined modulating and coding methods, and transmitted to the terminal at step S370.

The scheduling information is the minimum information for addressing the allocated radio resource and includes a terminal scheduling identifier (ID), radio resource allocation information indicating a location of the allocated radio resource block, modulation method information and coding method information. The scheduling information may further include additional information for operation such as retransmission and multiple antenna application.

Figure 5:
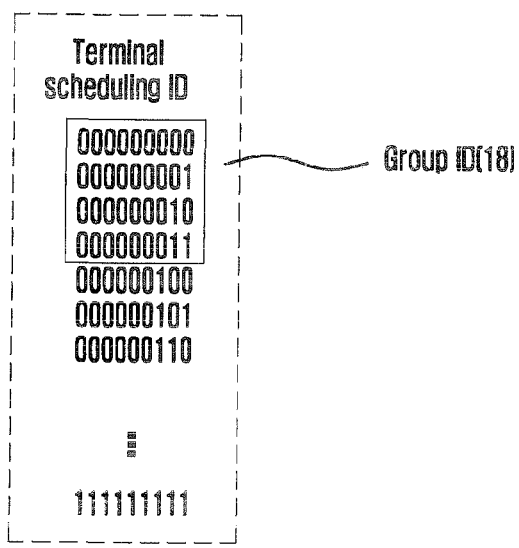
FIG. 5 shows a group identifier (ID) to which a part of a terminal scheduling ID is allocated in accordance with an embodiment of the present invention.

The terminal scheduling ID is an ID for identifying a specific terminal or a terminal group between the terminal and the scheduler of the base station. As shown in FIG. 5, the present invention is operated by reserving and allocating a part of the information included in the terminal scheduling ID as a group ID for paging information. The group ID is an ID used by reserving and allocating a part of a scheduling ID (i.e., a cell radio network temporary identifier (C-RNTI)) for uniquely identifying a terminal. A base station may operate by reserving at least one scheduling ID.

Meanwhile, the group ID may be used to indicate downlink information transmission below.

The radio resource allocation contents inform a radio resource location or section of an Orthogonal Frequency Division Multiplexing (OFDM) method, which is divided into a frequency region and a time region. The modulation method contents inform which modulation method among a plurality of modulation methods applied in the LTE system is applied. The coding method contents inform which coding method among a plurality of coding methods applied in the LTE system is applied.

According to the second embodiment of the present invention, a paging procedure may be performed on the terminals in the RRC_Idle state without the physical paging indication channel (PICH). In the present embodiment, when paging information is not generated, radio resource applicability (utilizable level) can be maximized by transmitting only scheduling information for the terminals without scheduling information for a paging message in the physical layer control channel information, and mapping and using available physical layer radio resources as DL-SCH for data information transmission. Also, the radio resource applicability may be optimized through a method for flexibly allocating the radio resource of the physical layer based on the quantity of the generated paging information.

Part of the terminal scheduling ID may be reserved, allocated and used by a group ID, and more than one group ID may be reserved and allocated according to the capability of the terminal. The group ID may be broadcasted through a system broadcasting channel. When the terminal is in a network, the group ID is managed according to each group and managed through modification/update based on a network environment.

FIG. 6 shows a physical layer control channel to which scheduling ID information is allocated and a radio resource to which paging information is variably allocated in accordance with the second embodiment of the present invention.

According to a procedure in accordance with the embodiment described above, a radio resource as shown in FIG. 6 is formed and transmitted to the terminal. The terminal receiving the radio resource searches a control channel 11 of the physical layer, recognizes the group ID reserved and allocated for transmission of paging information, which is given for the scheduler of the base station to identify the terminal or the terminal group in a cell, receives and decodes paging information transmitted to the radio resource block 12 based on radio resource block addressing information. That is, the terminals may recognize whether the paging message on the terminal group exists by searching a control channel and checking existence of the group ID reserved and allocated for transmission of the paging information in the scheduling information of the control channel transmitted from the base station. Therefore, when there is no group ID for the paging message indicating own group in the control channel, the terminals determine that the paging message does not exist, and continuously performs a discontinuous reception operation. When the group ID exists, the terminals stop the discontinuous reception operation and receive the paging message that the base station transmits on the radio resource addressed by the group ID.

In this case, a modulating and coding method of the block transmitting the paging message broadcasts the paging message to the entire cell based on the system information, or may transmit the paging message through the scheduling information of the physical layer control channel as described above.

In the RRC_Connected state, when a state for low power consumption is controlled according to an activity factor occupying the radio resource between the terminal and the base station in an MAC point of view, the terminal is operated by being divided into a duration of monitoring downlink data and a duration of sleeping for performing low power consumption according to the discontinuous reception/discontinuous transmission (DRX/TDX) cycle.

In the RRC_Connected state, when the terminal performs power saving operation of monitoring a downlink signal on monitoring duration according to the discontinuous reception/discontinuous transmission cycle, a paging procedure similar to the RRC_Idle state is required in the monitoring duration of the terminal to start transmitting information on the downlink. The paging procedure is defined as indication to be differentiated from paging in the RRC_Idle state. Indication information is information notifying start of transmitting downlink information from the base station to the terminal like the paging information. Herein, in the RRC_Idle state, the RRC layer of the base station is in charge of control, but in the RRC_Connected state, the RRC layer or the MAC layer is in charge of control relatively to the function of the scheduler.

When indication information for downlink information transmission in the RRC_Connected state is transmitted, the paging information transmitting method according to the embodiment described above may be used without any change. That is, the paging information transmitting method is adaptable by substituting indication information for downlink information transmission for the paging information in the embodiment described above.

To be specific, the scheduler of the base station transmits scheduling information, which is transmitted to the physical layer control channel according to the configured discontinuous reception/discontinuous transmission cycle, including the terminal scheduling ID and radio resource allocation information for the terminal which should receive indication information notifying downlink information transmission, or the terminal group. Therefore, in the duration that the terminal in the RRC_Connected state performs monitoring according to the configured discontinuous reception/discontinuous transmission cycle, the terminal performing low power consumption operation according to the activity factor of the terminal searches the control channel of the physical layer transmitted from the base station, recognizes a scheduling ID for the terminal or the group ID reserved and allocated for indication allowed to identify a terminal or a group in the cell by the scheduler of the base station, and receives and decodes the indication message transmitted on the radio resource block using the radio resource allocation information. In this case, it is possible to broadcast the modulating and coding method of the block transmitting the indication to the entire cell through the system information, or to transmit the modulating and coding method through the scheduling information of the physical layer control channel.

It is also possible to include only the group ID reserved and allocated for the indication of downlink information in the physical layer control channel in order to reduce overhead due to control information transmission by reducing the size of the physical layer control channel information. In this case, the radio resource block 12 of the physical channel for the indication information can be fixed and operated in the inside of the corresponding TTI.

When the method of the second embodiment transmitting the indication message through the control channel and the DL-SCH of the physical layer to notify downlink information transmission for the terminals in the RRC_Connected state is applied, the DL-SCH and the physical layer control channel can be used in the same method although the activity attribute of the terminal is different in the RRC_Connected state under control of the scheduler and the MAC.

Figure 7:
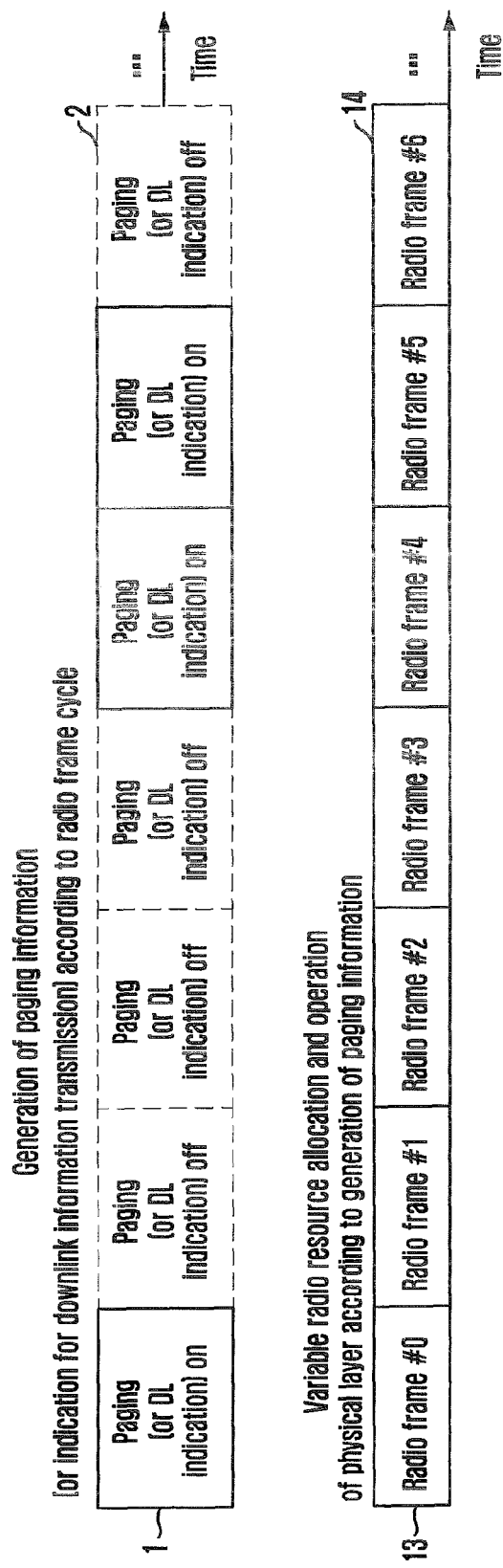
FIG. 7 shows an example that the radio resource of the physical layer is variably allocated and operated corresponding to generation of the paging information in accordance with an embodiment of the present invention.

FIG. 7 shows an example that the radio resource of the physical layer is variably allocated and operated corresponding to generation of the paging information in accordance with an embodiment of the present invention.

As shown in FIG. 7, only when paging information for the terminals in the RRC_Idle state or downlink indication information for the terminals in the RRC_Connected state is generated, the present invention occupies the radio resource of the physical layer and may efficiently operate the limited radio resource.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

What is claimed is:
1. A wireless communication method, the method comprising:
    receiving, at a user equipment, first information during a first transmission time interval (TTI), wherein the first TTI comprises a control channel and a shared channel, and the first information is received in the control channel;
    obtaining, at the user equipment, an identifier from the first information; and
    obtaining, at the user equipment, paging information, in the shared channel during the first TTI from physical layer radio resources identified by a portion of the first information,
    wherein the first information does not include any information indicating the user equipment.

2. The method of claim 1, wherein:
the paging information comprises another identifier which indicates that the paging information is intended for the user equipment; and
the first information further indicates a coding scheme for the paging information.

3. The method of claim 1, wherein the user equipment obtains the identifier based on the first information according to a discontinuous reception (DRX) cycle and the user equipment is in Radio Resource Control (RRC) connected state.

4. The method of claim 1, wherein the identifier indicates that paging information is to be transmitted.

5. The method of claim 1, wherein:
the physical layer radio resources for the paging information are flexibly allocated according to whether or not the paging information is transmitted in the shared channel.

6. The method of claim 1, wherein:
the identifier has a predetermined value which indicates that paging information is to be transmitted during the TTI.

7. The method of claim 1, wherein the paging information is obtained before the user equipment determines the paging information is intended for the user equipment.

8. A user equipment (UE), comprising:
a circuitry which is configured to:
cause the UE to receive first information during a first transmission time interval (TTI), wherein the first TTI comprises a control channel and a shared channel, and the first information is received in the control channel;
cause the UE to obtain an identifier from the first information; and
cause the UE to obtain paging information, in the shared channel during the first TTI from physical layer radio resources identified by a portion of the first information,
wherein the first information does not include any information indicating the user equipment.

9. The UE of claim 8, wherein:
the paging information comprises another identifier which indicates that the paging information is intended for the user equipment; and
the first information further indicates a coding scheme for the paging information.

10. The UE of claim 8, wherein the circuitry is further configured to obtain the identifier based on the first information according to a discontinuous reception (DRX) cycle and the user equipment is in Radio Resource Control (RRC) connected state.

11. The UE of claim 8, wherein the identifier indicates that paging information is to be transmitted.

12. The UE of claim 8, wherein:
the physical layer radio resources for the paging information are flexibly allocated according to whether or not the paging information is transmitted in the shared channel.

13. The UE of claim 8, wherein:
the identifier has a predetermined value which indicates that paging information is to be transmitted during the TTI.

14. The UE of claim 8, wherein the paging information is obtained before the user equipment determines the paging information is intended for the user equipment.

15. A communication device for a user equipment (UE), the communication device comprising:
a circuitry which is configured to:
cause the UE to receive first information during a first transmission time interval (TTI), wherein the first TTI comprises a control channel and a shared channel, and the first information is received in the control channel;
cause the UE to obtain an identifier from the first information; and
cause the UE to obtain paging information, in the shared channel during the first TTI from physical layer radio resources identified by a portion of the first information,
wherein the first information does not include any information indicating the user equipment.

16. The communication device of claim 15, wherein:
the paging information comprises another identifier which indicates that the paging information is intended for the user equipment; and
the first information further indicates a coding scheme for the paging information.

17. The communication device of claim 15, wherein the circuitry is further configured to obtain the identifier based on the first information according to a discontinuous reception (DRX) cycle and the user equipment is in Radio Resource Control (RRC) connected state.

18. The communication device of claim 15, wherein the identifier indicates that paging information is to be transmitted.

19. The communication device of claim 15, wherein:
the physical layer radio resources for the paging information are flexibly allocated according to whether or not the paging information is transmitted in the shared channel.

20. The communication device of claim 15, wherein:
the identifier has a predetermined value which indicates that paging information is to be transmitted during the TTI.

21. The communication device of claim 15, wherein the paging information is obtained before the user equipment determines the paging information is intended for the user equipment.

* * * * *